(12) United States Patent
Huang et al.

(10) Patent No.: US 12,258,442 B2
(45) Date of Patent: Mar. 25, 2025

(54) POLYESTER AND MOLDED ARTICLE

(71) Applicant: Chang Chun Plastics Co., Ltd., Taipei (TW)

(72) Inventors: Ching-Jui Huang, Taipei (TW); Ping-Chieh Wang, Taipei (TW); June-Yen Chou, Taipei (TW)

(73) Assignee: Chang Chun Plastics Co., Ltd., Taipei (TW)

( * ) Notice: Subject to any disclaimer, the term of this patent is extended or adjusted under 35 U.S.C. 154(b) by 0 days.

(21) Appl. No.: 18/125,227

(22) Filed: Mar. 23, 2023

(65) Prior Publication Data

US 2023/0323022 A1 Oct. 12, 2023

(30) Foreign Application Priority Data

Mar. 23, 2022 (TW) .................................. 111110930

(51) Int. Cl.
*C08G 63/199* (2006.01)
*C08G 63/80* (2006.01)

(52) U.S. Cl.
CPC ........... *C08G 63/199* (2013.01); *C08G 63/80* (2013.01)

(58) Field of Classification Search
CPC .. C08G 63/181; C08G 63/183; C08G 63/199; C08G 63/80
See application file for complete search history.

(56) References Cited

U.S. PATENT DOCUMENTS

| | | | |
|---|---|---|---|
| 5,608,031 A | 3/1997 | Yau et al. | |
| 11,485,820 B2 * | 11/2022 | Huang | C08G 63/672 |
| 11,760,834 B2 * | 9/2023 | Huang | C08G 63/85 528/282 |
| 2005/0222375 A1 * | 10/2005 | Mitsuyasu | C08G 63/199 528/272 |
| 2014/0370219 A1 * | 12/2014 | Ogawa | C08G 63/199 528/298 |
| 2019/0048124 A1 | 2/2019 | Strand et al. | |
| 2019/0071532 A1 | 3/2019 | Strand et al. | |
| 2019/0077908 A1 * | 3/2019 | Sim | C09D 167/025 |
| 2023/0340189 A1 * | 10/2023 | Huang | C08G 63/183 |

FOREIGN PATENT DOCUMENTS

| | | | |
|---|---|---|---|
| CN | 103130991 B | | 5/2015 |
| CN | 111499846 A | | 8/2020 |
| JP | 2003-119259 | * | 4/2003 |

(Continued)

OTHER PUBLICATIONS

W. F. H. Borman "Molecular Weight-Viscosity Relationships for Poly ( 1,4- butylene Terephthalate)", Journal of Applied Polymer Science, vol. 22, 2119-2126 (1978) (Year: 1978).*

(Continued)

*Primary Examiner* — Frances Tischler
*Assistant Examiner* — Gennadiy Mesh
(74) *Attorney, Agent, or Firm* — Joseph C. Zucchero; Carolyn S. Elmore; Elmore Patent Law Group, P.C.

(57) ABSTRACT

The present disclosure provides a polyester including residues of formulas (i), (ii), (iii), and (iv):

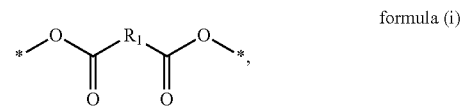

formula (i)

for example, terephthalic acid,

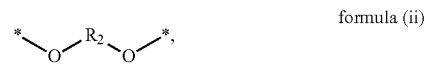

formula (ii)

for example, ethylene glycol,

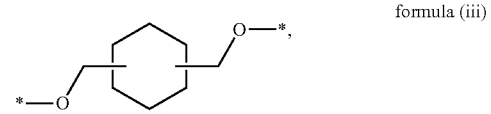

formula (iii)

for example, cyclohexanedimethanol, and

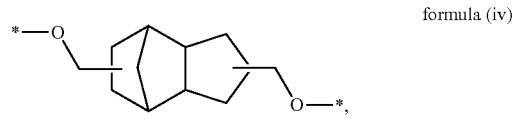

formula (iv)

for example, tricyclodecane dimethanol, in which $R_1$ is an aromatic group, $R_2$ is a $C_2$-$C_6$ straight-chain hydrocarbon group, * represents a linking bond. Based on 100 mol % of a sum of the residues of the formula (ii), the formula (iii) and the formula (iv), a content of the residue of the formula (iii) ranges from 50 mol % to 85 mol %, and the residue of the formula (iv) ranges from 12 mol % to 40 mol %. The polyester has excellent impact strength, elongation, hardness, and heat resistance, and can be used in applications such as shaped materials of food contacts, automotive molds, commercial housewares, compounders consumers, electronics, device housings, in-store fixtures, electronic packaging, outdoor signs, personal care, cosmetics packaging, sporting equipment tools, and toys and water/sport bottles.

8 Claims, No Drawings

(56) References Cited

FOREIGN PATENT DOCUMENTS

| JP | 2004346131 | A | | 12/2004 |
| JP | 4157071 | B2 | | 7/2008 |
| JP | 2015143309 | | * | 8/2015 |
| JP | 2015143309 | A | | 8/2015 |
| TW | 201627348 | A | | 8/2016 |

OTHER PUBLICATIONS

Paul J. Flory "Viscosities of Linear Polyesters. An Exact Relationship between Viscosity and Chain Length", J. Am. Chem. Soc. 1940, 62, 5, 1057-1070 (Year: 1940).*

Th. Rieckmann et al "Poly(Ethylene Terephthalate) Polymerization—Mechanism, Catalysis, Kinetics, Mass Transfer and Reactor Design", Chapter II of Modern Polyesters: Chemistry and Technology of Polyesters and Copolyesters, 2003 (Year: 2003).*

Yuhsin Tsai et al Synthesis, microstructures and properties of amorphous poly(ethylene terephthalate-co-tricyclodecanedimethylene terephthalate), J Polym Res (2016) 23: 42 (Year: 2016).*

Donald R. Kelsey et al "High Impact, Amorphous Terephthalate Copolyesters of Rigid 2,2,4,4-Tetramethyl-1,3-cyclobutanediol with Flexible Diols", Macromolecules 2000, 33, 5810-5818 (Year: 2000).*

Yuhsin Tsai et al "Amorphous Copolyesters Based on 1,3/1,4-Cyclohexanedimethanol: Synthesis, Characterization and Properties", Journal of Applied Polymer Science, vol. 109, 2598-2604 (2008) (Year: 2008).*

Allowed claims with translation for TW111110930, dated Nov. 1, 2023.

Notice of Allowance with translation for TW111110930, dated Nov. 1, 2023.

Office Action with translation for TW111110930, dated Mar. 27, 2023.

* cited by examiner

POLYESTER AND MOLDED ARTICLE

CROSS-REFERENCE TO RELATED APPLICATION

This application claims priority to Taiwan Application Serial Number 111110930, filed Mar. 23, 2022, which is herein incorporated by reference.

BACKGROUND

Field of Disclosure

The present disclosure relates to a polyester and a molded article.

Description of Related Art

Conventional poly(ethylene terephthalateco-1,4-cylclohexylenedimethylene terephthalate) (PETG) exhibits high elongation. However, impact strength, glass transition temperature ($T_g$), hardness, and other properties of PETG are not sufficient to meet the needs of the industry. Therefore, there is currently a need for a polyester material that, while providing its high impact strength, can have properties such as high elongation, high hardness, and high $T_g$ to meet the needs of the industry.

SUMMARY

The present disclosure provides a polyester, which includes residues of formula (i), formula (ii), formula (iii) and formula (iv):

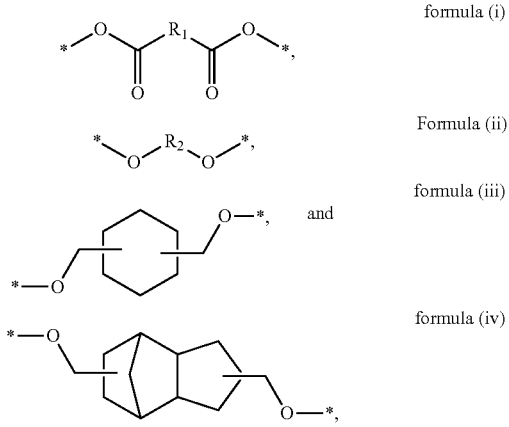

in which $R_1$ is an aromatic group, $R_2$ is a $C_2$-$C_6$ straight-chain hydrocarbon group, * represents a linking bond, and based on 100 mol % of a sum of the residues of the formula (ii), the formula (iii), and the formula (iv), a content of the residue of the formula (iii) ranges from 50 mol % to 85 mol %, and the residue of the formula (iv) ranges from 12 mol % to 40 mol %.

In one or more embodiments of the present disclosure, $R_1$ is

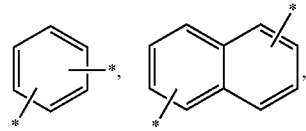

or a combination thereof.

In one or more embodiments of the present disclosure, $R_2$ is a $C_2$-$C_4$ straight-chain hydrocarbon group.

In one or more embodiments of the present disclosure, $R_2$ is a $C_2$ straight-chain hydrocarbon group.

In one or more embodiments of the present disclosure, a number average molecular weight of the polyester is greater than or equal to 20,000 Daltons.

In one or more embodiments of the present disclosure, the number average molecular weight ranges from 25,000 Daltons to 30,000 Daltons.

In one or more embodiments of the present disclosure, based on 100 mol % of the sum of the residues of the formula (ii), the formula (iii), and the formula (iv), a content of the residue of the formula (ii) ranges from 3 mol % to 15 mol %.

In one or more embodiments of the present disclosure, based on 100 mol % of the sum of the residues of the formula (ii), the formula (iii), and the formula (iv), the content of the residue of the formula (iii) ranges from 51 mol % to 83 mol %.

In one or more embodiments of the present disclosure, based on 100 mol % of the sum of the residues of the formula (ii), the formula (iii), and the formula (iv), the content of the residue of the formula (iv) ranges from 15 mol % to 35 mol %.

The present disclosure also provides a molded article. This molded article includes any one of the polyesters of the above-mentioned embodiments.

DETAILED DESCRIPTION

In order to make the description of the present disclosure more detailed and complete, the following provides an illustrative description for the implementation of the present disclosure and specific embodiments; but this is not the only way to implement or use the specific embodiments of the present disclosure. The embodiments disclosed below can be combined or substituted with each other under beneficial circumstances, and other embodiments can also be added to an embodiment without further description. In the following description, many specific details will be described in detail to enable the reader to fully understand the following embodiments. However, the embodiments of the present disclosure can be practiced without such specific details.

Although a series of operations or steps are used below to describe methods disclosed herein, the order in which these operations or steps are shown should not be construed as limiting the present disclosure. For example, certain operations or steps may be performed in a different order and/or concurrently with other steps. Furthermore, not all illustrated operations, steps and/or features must be performed in order to implement embodiments of the present disclosure. Furthermore, each operation or step described herein may contain several sub-steps or actions.

The present disclosure provides a polyester. The polyester includes residues of formula (i), formula (ii), formula (iii) and formula (iv):

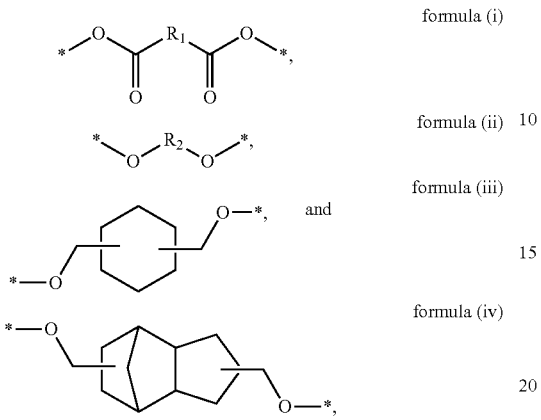

formula (i)

formula (ii)

formula (iii)

and formula (iv)

in which $R_1$ is an aromatic group, $R_2$ is a $C_2$-$C_6$ straight-chain hydrocarbon group, * represents a linking bond. It is understood that the residues of the formula (i), the formula (ii), the formula (iii), and the formula (iv) of the polyester of the present disclosure have specific molar ratios to provide the polyester with good mechanical properties, which will be described in detail below.

The residue of the formula (i) is derived from a diacid monomer. In some embodiments, the diacid monomer includes an aromatic dicarboxylic acid. In some embodiments, $R_1$ of the formula (i) is a $C_6$-$C_{16}$ aromatic group. In some embodiments, $R_1$ of the formula (i) is

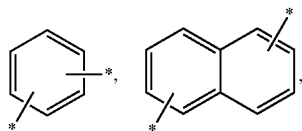

or a combination thereof, in which * represents a linking bond. In some embodiments, the aromatic dicarboxylic acid may be, for example, terephthalic acid (PTA) or 2,6-naphthalenedicarboxylic acid (NDA). In some embodiments, a molar number of the formula (i) is about 50 mol % of a sum of molar numbers of the formulas (i) to (iv).

The residue of the formula (ii) is derived from a straight-chain diol monomer. In some embodiments, the straight-chain diol monomer includes an aliphatic straight-chain diol. In some embodiments of the present disclosure, $R_2$ of the formula (ii) is a $C_2$-$C_6$ straight-chain hydrocarbon group, preferably, $R_2$ is a $C_2$-$C_4$ straight-chain hydrocarbon group, more preferably, $R_2$ is a $C_2$ straight-chain hydrocarbon group. In some embodiments, the aliphatic straight-chain diol may be, for example, ethylene glycol. In some embodiments of the present disclosure, based on 100 mol % of the sum of the residues of the formula (ii), the formula (iii), and the formula (iv), a content of the formula (ii) ranges from 3 mol % to 15 mol %, such as 3 mol %, 4 mol %, 5 mol %, 6 mol %, 7 mol %, 8 mol %, 9 mol %, 10 mol %, 11 mol %, 12 mol %, 13 mol %, 14 mol %, or 15 mol %.

The residue of formula (iii) is derived from a monocycloalkanediol monomer. In some embodiments, the monocycloalkanediol monomer includes an aliphatic monocyclic diol. In some embodiments, the aliphatic monocyclic diol may be, for example,

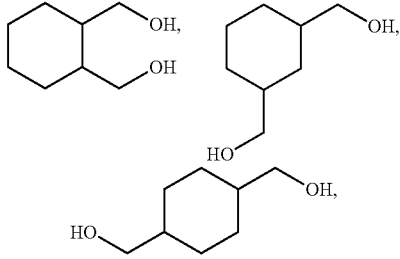

or a combination thereof. In one or more embodiments of the present disclosure, based on 100 mol % of the sum of the residues of the formula (ii), the formula (iii), and the formula (iv), a content of the residue of the formula (iii) ranges from 50 mol % to 85 mol %, preferably ranges from 51 mol % to 84 mol %, more preferably ranges from 51 mol % to 83 mol %, especially more preferably ranges from 51 mol % to 77 mol %, such as 55 mol %, 56 mol %, 57 mol %, 58 mol %, 59 mol %, 60 mol %, 61 mol %, 62 mol %, 63 mol %, 64 mol %, 65 mol %, 66 mol %, 67 mol %, 68 mol %, 69 mol %, 70 mol %, 71 mol %, 72 mol %, 73 mol %, 74 mol %, 75 mol %, 76 mol %, or 77 mol %.

The residue of the formula (iv) is derived from a polycycloalkanediol. In some embodiments, the polycycloalkanediol monomer includes a fused ring diol. In some embodiments, the fused ring diol may be, for example,

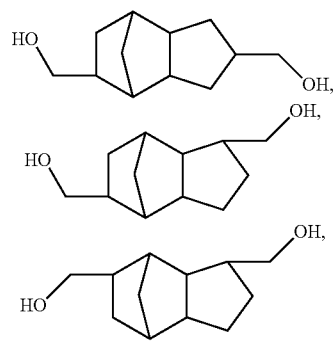

or a combination thereof. In one or more embodiments of the present disclosure, based on 100 mol % of the sum of the residues of the formula (ii), the formula (iii), and the formula (iv), a content of the residue of the formula (iv) ranges from 12 mol % to 40 mol %, preferably ranges from 12 mol % to 35 mol %, more preferably ranges from 12 mol % to 32 mol %, such as 12 mol %, 13 mol %, 14 mol %, 15 mol %, 16 mol %, 17 mol %, 18 mol %, 19 mol %, 20 mol %, 21 mol %, 22 mol %, 23 mol %, 24 mol %, 25 mol %, 26 mol %, 27 mol %, 28 mol %, 29 mol %, 30 mol %, 31 mol %, or 32 mol %.

In one or more embodiments of the present disclosure, a number average molecular weight (Mn) of the polyester is greater than or equal to 20,000 Daltons, preferably greater than or equal to 25,000 Daltons, more preferably ranges from 25,000 Daltons to 30,000 Daltons, such as 25,000 Daltons, 25,500 Daltons, 26,000 Daltons, 26,500 Daltons, 27,000 Daltons, 27,500 Daltons, 28,000 Daltons, 28,500

Daltons, 29,000 Daltons, 29,500 Daltons, 30,000 Daltons, or a range between any two of foregoing values. In another embodiment of the present disclosure, a weight average molecular weight (Mw) of the polyester is greater than or equal to 60,000 Daltons, preferably ranges from 60,000 Daltons to 75,000 Daltons, more preferably ranges from 62,000 to 73,000 Daltons, such as 62,000 Daltons, 62,500 Daltons, 63,000 Daltons, 63,500 Daltons, 64,000 Daltons, 64,500 Daltons, 65,000 Daltons, 65,500 Daltons, 66,000 Daltons, 66,500 Daltons, 67,000 Daltons, 67,500 Daltons, 68,000 Daltons, 68,500 Daltons, 69,000 Daltons, 69,500 Daltons, 70,000 Daltons, 70,500 Daltons, 71,000 Daltons, 71,500 Daltons, 72,000 Daltons, 72,500 Daltons, 73,000 Daltons, or a range between any two of foregoing values.

In some embodiments, the polyester further includes a residue of formula (v):

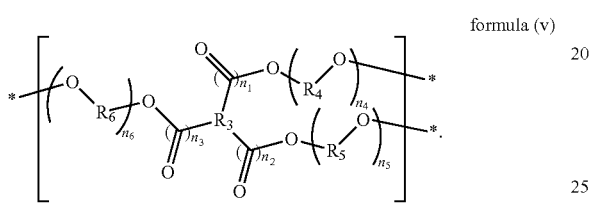

formula (v)

The residue of the formula (v) is derived from a polyacid monomer. In some embodiments, $R_3$ of the formula (v) is a $C_3$-$C_{20}$ hydrocarbon group, $R_4$, $R_5$, and $R_6$ are each independently a $C_1$-$C_6$ hydrocarbon group, $n_1$, $n_2$, $n_3$, $n_4$, $n_5$, and $n_1$ are each independently 0 or 1, and * represents a linking bond.

In some embodiments, the residue of the formula (v) is selected from the group consisting of:

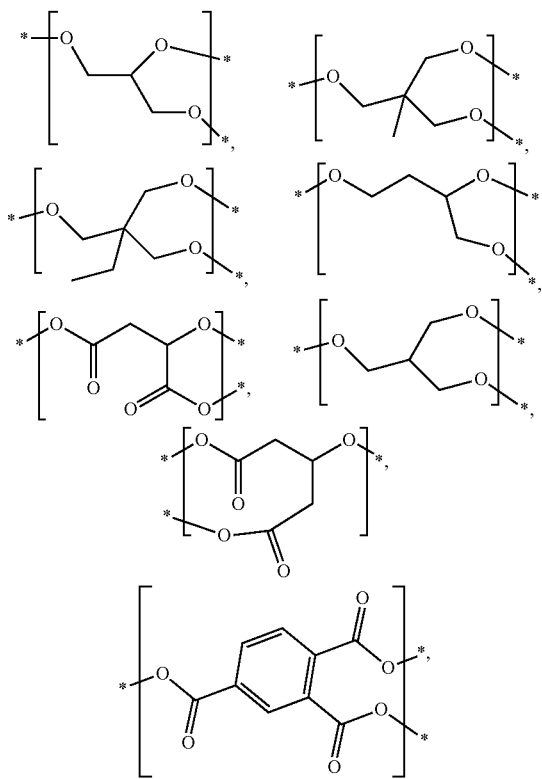

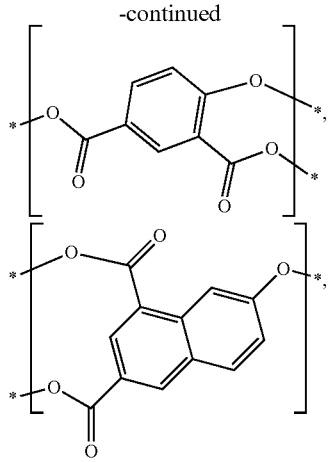

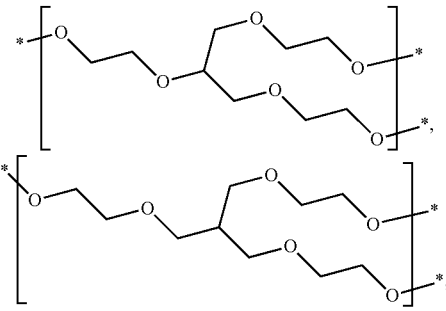

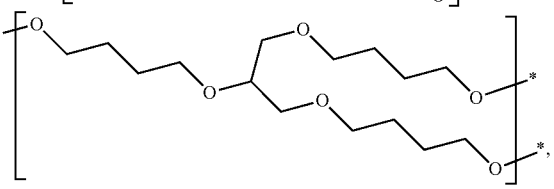

and a combination thereof, in which represents a linking bond.

In some embodiments, the residue of the formula (v) is present in an amount of less than or equal to 0.7 mol % of the whole polyester. Preferably, in some embodiments, the residue of the formula (v) ranges from 0.1 mol % to 0.7 mol % of the whole polyester, such as 0.2 mol %, 0.3 mol %, 0.4 mol %, 0.5 mol %, or 0.6 mol %.

The present disclosure also provides a molded article. The molded article includes the above-mentioned polyester. According to various embodiments, the polyester of the present disclosure may be used in applications such as shaped materials of food contacts, automotive molds, commercial housewares, compounders consumers, electronics, device housings, in-store fixtures, electronic packaging, outdoor signs, personal care, cosmetics packaging, sporting equipment tools, toys and water/sport bottles, but not limited thereto.

Since the polyester of the present disclosure can be used as a material for the molded article that come into contact with living organisms, in one or more embodiments of the present disclosure, the polyester is substantially free of monomers derived from bisphenol A (BPA). Preferably, in another embodiment of the present disclosure, the polyester is completely free of monomers derived from BPA.

The polyester of the present disclosure may be formed by esterification polymerization of a variety of different monomers. In some embodiments of the present disclosure, the polyester may be prepared by following steps, including:

step (a): mixing reactive monomers to form a mixture; step (b): subjecting the reactive monomers to an esterification reaction to form oligomers; and step (c): further polymerizing the oligomers to form a polymer.

The reaction monomers of the step (a) include a dibasic acid monomer, a straight-chain diol monomer, a monocycloalkanediol monomer, and a polycycloalkanediol monomer. The dibasic acid monomer may be an aromatic dicarboxylic acid. The straight-chain diol monomer may be, for example, an aliphatic straight-chain diol. The monocycloalkanediol monomer may be, for example, an aliphatic monocyclic diol. The polycycloalkanediol monomer may be, for example, a fused ring diol.

In the step (a), the reaction monomers are added to an autoclave. The autoclave may be, for example, a vertical autoclave, a horizontal autoclave, a batch autoclave, or a continuous series autoclave, but is not limited thereto. In some embodiments, the reaction monomers are uniformly agitated, in which an agitation rate ranges from 100 rpm to 500 rpm. In some embodiments, a catalyst may be added in the step (a) to facilitate the reaction. In other embodiments, a catalyst may be added in the step (b). The catalyst may be, for example, titanium(IV) butoxide, antimony trioxide ($Sb_2O_3$), antimony triacetate ($Sb(OAc)_3$), germanium dioxide ($GeO_2$), titanium(IV) isopropoxide, butyltin tris(2-ethylhexanoate), or a combination thereof, but not limited thereto. In an implementation aspect of the present disclosure, titanium(IV) butoxide was used as the catalyst.

In some embodiments, a co-catalyst and/or a thermal stabilizer may be added in the step (a) as needed. In other embodiments, a co-catalyst and/or a thermal stabilizer may be added in the step (b). The co-catalyst may be, for example, copper acetate, zinc acetate, magnesium acetate, sodium acetate, potassium acetate, but not limited thereto. In an implementation aspect of the present disclosure, no co-catalyst was added. The thermal stabilizer may be, for example, phosphoric acid, phosphorous acid, hypophosphorous acid and its salts, trimethyl phosphate (TMP), triethyl phosphate (TEP), tripropyl phosphate (TPP), 3,9-bis(octadecyloxy)-2,4,8,10-tetraoxa-3,9-diphosphaspiro[5.5]undecane, bis(2,6-di-tert-butyl-4-methylphenyl)pentaerythritoldiphosphite), tris(2,4-di-tert-butylphenyl) phosphite, tetrakis(2,4-di-tert-butylphenyl)4,4'-biphenyl), but not limited thereto. In some embodiments, the polyester includes 20 ppm to 40 ppm of the thermal stabilizer, such as 20 ppm, 25 ppm, 30 ppm, 35 ppm, or 40 ppm. In an implementation aspect of the present disclosure, TMP was used as the heat stabilizer.

Next, the step (b) is performed, and the reaction monomers are subjected to the esterification reaction to form the oligomers. The step (b) includes heating the mixture of the step (a) to subject the reaction monomers to the esterification reaction to form the oligomers. In some embodiments, the mixture is heated from room temperature to about 220° C., or from room temperature to about 270° C. In some embodiments, suitable pressures for the step (b) are between 1 atm and 6 atm, preferably between 1.7 atm and 4 atm. In some embodiments, a reaction time of the step (b) ranges from 2 to 6 hours. Completion of the esterification reaction is judged by observing an amount of water or alcohol produced in the step (b). Specifically, through theoretical calculation, a theoretical amount of water or alcohol produced after all the monomers in the mixture are reacted can be obtained. When the amount of water or alcohol produced in the step (b) reaches more than 80% of the theoretical amount of water or alcohol, such as 85%, 90%, or 95%, it indicates that the esterification reaction is substantially complete.

The step (c) is then performed to further polymerize the oligomers to form the polymer. In some embodiments, the step (c) includes heating the oligomers to 250° C. to 300° C. and performing vacuum evacuation for 30 to 60 minutes so that an ambient pressure is less than 3 Torr, preferably less than 1 Torr. In some embodiments, a chain extender such as hexamethylene diisocyanate (HDI) is optionally added. A reaction time of the step (c) may be, for example, 1.5 hours to 8 hours. When a viscosity of the polymer reaches a certain value, the polymerization reaction is complete and the product can be collected. The polymer product is subjected to dicing and related inspection, and then dried to a moisture content of less than 200 ppm, preferably less than 100 ppm, more preferably less than 50 ppm, and then injection-molded.

Following experimental examples are used to describe specific aspects of the present disclosure in detail, and to enable those with ordinary skill in the art to practice the present disclosure. However, the following experimental examples are not intended to limit the present disclosure.

The steps of preparing the polyester in Example 1 included the steps (a) to (c). In the step (a), reaction monomers: ethylene glycol (EG), cyclohexanedimethanol (CHDM), tricyclodecane dimethanol (TCDDM), and terephthalic acid (PTA) were added into an autoclave for mixing to form a mixture, while an alcohol/acid addition ratio was controlled to be 1.2 to 2.0, in which the alcohol/acid addition ratio was a ratio of a sum of addition amounts of the diols to an addition amount of the dibasic acid. Next, the reaction monomers were uniformly agitated, in which an agitation rate was 100 rpm to 500 rpm, and 30 ppm of trimethyl phosphate (TMP) was added as the heat stabilizer.

Next, the step (b) was performed, and the mixture of the step (a) was heated from room temperature to 220° C. to 270° C. to make the reaction monomers carry out an esterification reaction to form oligomers, in which a pressure was 1 atm to 6 atm, and a reaction time was 2 hours to 6 hours. When an amount of water or alcohol produced reached 95% of the theoretical amount of water or alcohol, the step (c) was performed. In the step (c), the oligomers were heated to 250° C. to 300° C., and the oligomers were vacuumed for 30 minutes so that an ambient pressure was less than 1 Torr, and a reaction time was 1.5 hours to 8 hours. When a viscosity of the polymer reached a value of IV>0.7 dl/g, the material was discharged and diced, and it was measured that the polyester of Example 1 had Mw of 68,898 and Mn of 26,782. In the polyester residue of Example 1, the PTA content was 100 mol %, and the EG content was 10 mol %, and the CHDM content was 77 mol %, and the TCDDM content was 13 mol %.

The species of the reaction monomers and the reaction steps of Example 2 were roughly similar to those of Example 1. In the polyester residue of Example 2, the PTA content was 100 mol %, and the EG content was 15 mol %, and the CHDM content was 65 mol %, and the TCDDM content was 20 mol %. The polyester of Example 2 had Mw of 72,521 and Mn of 28,014.

The species of the reaction monomers and the reaction steps of Example 3 were roughly similar to those of Example 1. In the polyester residue of Example 3, the PTA content was 100 mol %, and the EG content was 5 mol %, and the CHDM content was 71 mol %, and the TCDDM content was 24 mol %. The polyester of Example 3 had Mw of 64,298 and Mn of 26,783.

The species of the reaction monomers and the reaction steps of Example 4 were roughly similar to those of Example 1. In the polyester residue of Example 4, the PTA content was 100 mol %, and the EG content was 9 mol %, and the CHDM content was 51 mol %, and the TCDDM content was 40 mol %. The polyester of Example 4 had Mw of 72,205 and Mn of 26,312.

The species of the reaction monomers and the reaction steps of Example 5 were roughly similar to those of Example 1. In the polyester residue of Example 5, the PTA content was 100 mol %, and the EG content was 5 mol %, and the CHDM content was 83 mol %, and the TCDDM content was 12 mol %. The polyester of Example 5 had Mw of 62,494 and Mn of 25,572.

The species of the reaction monomers and the reaction steps of Example 6 were roughly similar to those of Example 1. In the polyester residue of Example 6, the PTA content was 100 mol %, and the EG content was 12 mol %, and the CHDM content was 56 mol %, and the TCDDM content was 32 mol %. The polyester of Example 6 had Mw of 72,070 and Mn of 27,177.

Amount of reactants and reaction steps of Comparative Examples 1 to 11 are described in detail below.

The species of the reaction monomers and the reaction steps of Comparative Example 1 were roughly similar to those of Example 1, but in the step (a), CHDM was not added. In the polyester residue of Comparative Example 1, the PTA content was 100 mol %, the EG content was 25 mol %, and the TCDDM content was 75 mol %. The polyester of Comparative Example 1 had Mw of 69,568 and Mn of 20,545.

The species of the reaction monomers, the added amounts of the reaction monomers and the reaction steps of Comparative Example 2 were roughly similar to those of Example 1, but in the step (a), TCDDM was not added. In the polyester residue of Comparative Example 2, the PTA content was 100 mol %, the EG content was 69 mol %, and the CHDM content was 31 mol %. The polyester of Comparative Example 2 had Mw of 72,232 and Mn of 22,304.

The species of the reaction monomers, the added amounts of the reaction monomers and the reaction steps of Comparative Example 3 were roughly similar to those of Example 1, but in the step (a), TCDDM was not added. In the polyester residue of Comparative Example 3, the PTA content was 100 mol %, the EG content was 20 mol %, and the CHDM content was 80 mol %. The polyester of Comparative Example 3 had Mw of 73,124 and Mn of 27,853.

The species of the reaction monomers, the added amounts of the reaction monomers and the reaction steps of Comparative Example 4 were roughly similar to those of Example 1, but in the step (a), TCDDM was not added. In the polyester residue of Comparative Example 4, the PTA content was 100 mol %, the EG content was 37 mol %, and the CHDM content was 63 mol %. The polyester of Comparative Example 4 had Mw of 71,118 and Mn of 26,099.

The species of the reaction monomers, the added amounts of the reaction monomers and the reaction steps of Comparative Example 5 were roughly similar to those of Example 1. In the polyester residue of Comparative Example 5, the PTA content was 100 mol %, the EG content was 12 mot %, and the CHDM content was 41 mol %, and the TCDDM content was 47 mol %. The polyester of Comparative Example 5 had Mw of 73,928 and Mn of 25,600.

The species of the reaction monomers, the added amounts of the reaction monomers and the reaction steps of Comparative Example 6 were roughly similar to those of Example 1. In the polyester residue of Comparative Example 6, the PTA content was 100 mol %, the EG content was 20 mol %, and the CHDM content was 8 mol %, and the TCDDM content was 72 mol %. The polyester of Comparative Example 6 had Mw of 68,218 and Mn of 20,262.

The species of the reaction monomers, the added amounts of the reaction monomers and the reaction steps of Comparative Example 7 were roughly similar to those of Example 1. In the polyester residue of Comparative Example 7, the PTA content was 100 mol %, the EG content was 18 mol %, and the CHDM content was 13 mol %, and the TCDDM content was 69 mol %. The polyester of Comparative Example 7 had Mw of 53,691 and Mn of 18,228.

Comparative Example 8 was a commercially available polycarbonate (PC) with a melt index (MI) of 22. The polycarbonate of Comparative Example 8 had Mw of 46,877 and Mn of 19,970.

The species of the reaction monomers, the added amounts of the reaction monomers and the reaction steps of Comparative Example 9 were roughly similar to those of Example 1. In the polyester residue of Comparative Example 9, the PTA content was 100 mol %, the EG content was 5 mol %, and the CHDM content was 85 mol %, and the TCDDM content was 10 mol %. The polyester of Comparative Example 9 had Mw of 55,525 and Mn of 23,444.

The species of the reaction monomers and the reaction steps of Comparative Example 10 were the same as those of Example 1, but the reaction monomers in the step (a) did not contain EG. In the polyester residue of Comparative Example 10, the PTA content was 100 mol %, the CHDM content was 70 mol %, and the TCDDM content was 30 mol %. The polyester of Comparative Example 10 had Mw of 22,820 and Mn of 9,649.

The species of the reaction monomers and the reaction steps of Comparative Example 11 were the same as those of Example 1, but in the step (a), 2-methyl-1,3-propanediol (MPDO) replaced EG. In the polyester residue of Comparative Example 11, the PTA content was 100 mol %, the MPDO content was 15 mol %, and the CHDM content was 65 mol %, and the TCDDM content was 20 mol %. The polyester of Comparative Example 11 had Mw of 38,328 and Mn of 17,222.

The above-mentioned weight average molecular weight (Mw) and number average molecular weight (Mn) were measured by gel permeation chromatography (GPC). Specifically, following instruments: SHIMADZU LC-20AT PUMP, SPD-10A, SCL-10Avp Autosampler, and COLBOX COLUMN OVEN were used for the gel permeation chromatography. The used columns were HP $10^3$A, $10^4$A, and $10^5$A. The standard product was polystyrene from Japan TOSOH Company, and it was divided into two groups. Weight average molecular weights of a first group were 2,000,000, 434,000, 96,400, 18,100, 5,970 and 1,050, and weight average molecular weights of a second group were 950,000, 190,000, 37,900, 9,100, 2,630 and 531. When preparing, 0.03 g of the standard product was weighted according to the groups, 10 ml of chloroform ($CHCl_3$) was added to dissolve, a test calibration line $R^2$ reached 0.99, and the standard product was tested in parallel, and its molecular weight was equivalent to the standard value. A solvent was hexafluoro-2-propanol/chloroform, and a volume ratio was 119. An oven temperature was 35° C., and a flow rate was 0.8 ml/min. A detector used was SHIMADZU SPD-10A, and an injection volume was 10 µl, and an analysis time was 45 minutes. A pretreatment method of the sample was to weigh 0.01 g of the sample into an LC sample bottle, 0.1 ml of hexafluoro-2-propanol was added, 0.1 ml of chloroform was then added, and then stood at room temperature, and 1.5 ml of chloroform was added after dissolving, and then shook. After shaking well, it was ready to be analyzed.

The polymer products of Examples 1 to 6 and Comparative Examples 1 to 11 were tested for inherent viscosity (IV), impact resistance (Izod), elongation, glass transition temperature ($T_g$), melting temperature (Tm), flexural strength, Rockwell hardness, and haze. The inherent viscosity was tested in accordance with ASTM D4603. The impact resistance was tested in accordance with ISO180. The elongation was tested according to ISO 527. The glass transition temperature was tested in accordance with ISO 3146. The flexural strength was tested in accordance with ASTM D790. The Rockwell hardness was tested in accordance with ASTM D785. The haze was tested in accordance with ASTM D1003.

The following table 1 shows test results of Examples 2, 4, 5 and 6 and Comparative Examples 1, 8, 9, 10, and 11. In Table 1, O represents with BPA, and X represents without BPA. Please refer to Table 1 below. The reaction monomers of the polyester of Comparative Example 1 did not contain CHDM, and its impact resistance and elongation were low. However, using too much CHDM monomer in the preparation would cause the polyester to crystallize too fast, resulting in an increase in haze, for example, the haze of Comparative Example 9 was greater than 10%. Higher haze would result in poorer appearance and less suitable for subsequent applications. The reaction monomers of Comparative Example 10 did not contain EG, and thus it failed to synthesize the polyester having a suitable molecular weight. On the other hand, if a non-straight-chain diol monomer was used to replace the EG monomer, as shown in experimental results of Comparative Example 11, mechanical properties (e.g., impact resistance, elongation, etc.) of the polyester were reduced. Although the commercially available polycarbonate of Comparative Example 8 had good mechanical strength, it contained BPA and therefore had a concern about safety.

TABLE 1

|  | Examples | | | | Comparative Examples | | | | |
| --- | --- | --- | --- | --- | --- | --- | --- | --- | --- |
|  | 2 | 4 | 5 | 6 | 1 | 9 | 10 | 11 | 8 |
| IV (dl/g) | 0.78 | 0.76 | 0.74 | 0.78 | 0.67 | 0.63 | 0.35 | 0.5 | N.A. |
| impact resistance (KJ/m$^2$) | 4 | 3.71 | 5.53 | 4.14 | 2.67 | 3.72 | N.A. | 1.78 | 4.12 |
| elongation (%) | 229 | 210 | 184 | 206 | 180 | 171 | N.A. | 62.4 | 120 |
| haze (%) | <3% | <3% | <5% | <3% | <3% | >10% | N.A | <5% | <3% |
| BPA | X | X | X | X | X | X | X | X | O |

The following table 2 shows test results of Examples 3 and 6 and Comparative Examples 2, 3, and 4. Please refer to Table 2. The reaction monomers of the polyester of Comparative Examples 2, 3 and 4 did not contain TCDDM, and their $T_g$ and hardness were lower than those of the polyester of Examples 3 and 6 of the present disclosure, so heat resistance thereof was poor.

TABLE 2

|  | Examples | | Comparative Examples | | |
| --- | --- | --- | --- | --- | --- |
|  | 3 | 6 | 2 | 3 | 4 |
| IV (dl/g) | 0.75 | 0.78 | 0.82 | 0.8 | 0.83 |
| $T_g$ | 100 | 100 | 80 | 89 | 85 |
| flexural strength (MPa) | 62 | 65 | 62 | 58 | 60 |

TABLE 2-continued

|  | Examples | | Comparative Examples | | |
| --- | --- | --- | --- | --- | --- |
|  | 3 | 6 | 2 | 3 | 4 |
| Rockwell hardness | 107.5 | 106.5 | 95.8 | 93.1 | 94.2 |
| haze (%) | <3% | <3% | <3% | >10% | <3% |
| BPA | X | X | X | X | X |

Table 3 shows test results of Examples 1 and 4 and Comparative Examples 5, 6, and 7. Please refer to Table 3 below. Using too much TCDDM monomer (e.g., a content greater than 40 mol %) and too little CHDM monomer (e.g., a content less than 50 mol %) in the preparation of the polyester would reduce the impact strength of the polyester and reduce the elongation at the same time. For example, compared with Examples 1 and 4, the impact resistance and the elongation of the polyester of Comparative Examples 5, 6, and 7 were all lower.

TABLE 3

|  | Examples | | Comparative Examples | | |
| --- | --- | --- | --- | --- | --- |
|  | 1 | 4 | 5 | 6 | 7 |
| IV (dl/g) | 0.82 | 0.76 | 0.75 | 0.7 | 0.58 |
| impact resistance (KJ/m$^2$) | 5.81 | 3.71 | 2.64 | 2.7 | 2.56 |
| elongation (%) | 205 | 210 | 152 | 183 | 163 |
| BPA | X | X | X | X | X |

From the above Tables 1 to 3, the polyester of Examples 1 to 6 of the present disclosure all had good mechanical properties, which could be comparable to the commercially available polycarbonate (Comparative Example 8 in Table 1). In addition, the polyester of Examples 1 to 6 of the present disclosure did not contain BPA, so there was no concern about safety and could be used more widely.

In summary, the present disclosure provides the polyester polymerized from the specific molar ratio of the monomers, which includes the residues of the formula (i), the formula (ii), the formula (iii), and the formula (iv). The polyester provided by the present disclosure has excellent impact strength, high elongation, high hardness, heat resistance, etc., and does not contain BPA, so it can meet the needs of the industry and be used in the manufacture of various products.

The foregoing summarizes the features of several embodiments or examples so that aspects of the present disclosure may be better understood by those skilled in the art. Those skilled in the art should appreciate that they may readily use the present disclosure as a basis for designing or modifying other processes and structures for carrying out the same purposes and/or achieving the same advantages of the embodiments described herein. Those skilled in the art should also realize that these equivalent constructions do not depart from the spirit and scope of the present disclosure, and that they can make various changes, substitutions and alterations herein without departing from the spirit and scope of the present disclosure.

What is claimed is:

1. A polyester, comprising residues of formula (i), formula (ii), formula (iii) and formula (iv):

formula (i)

formula (ii)

formula (iii)

formula (iv)

wherein $R_1$ is an aromatic group, $R_2$ is a $C_2$-$C_6$ straight-chain hydrocarbon group, * represents a linking bond, based on 100 mol % of a sum of the residues of the formula (ii), the formula (iii), and the formula (iv), a content of the residue of the formula (ii) ranges from 5 mol % to 15 mol %, a content of the residue of the formula (iii) ranges from 50 mol % to 85 mol %, and a content of the residue of the formula (iv) ranges from 12 mol % to 40 mol %, a number average molecular weight of the polyester ranges from 20,000 Daltons to 30,000 Daltons, and an inherent viscosity of the polyester is larger than 0.7 dl/g.

2. The polyester of claim 1, wherein $R_1$ is

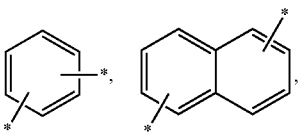

or a combination thereof.

3. The polyester of claim 1, wherein $R_2$ is a $C_2$-$C_4$ straight-chain hydrocarbon group.

4. The polyester of claim 3, wherein $R_2$ is a $C_2$ straight-chain hydrocarbon group.

5. The polyester of claim 1, wherein the number average molecular weight ranges from 25,000 Daltons to 30,000 Daltons.

6. The polyester of claim 1, wherein based on 100 mol % of the sum of the residues of the formula (ii), the formula (iii) and the formula (iv), the content of the residue of the formula (iii) ranges from 51 mol % to 83 mol %.

7. The polyester of claim 1, wherein based on 100 mol % of the sum of the residues of the formula (ii), the formula (iii) and the formula (iv), the content of the residue of the formula (iv) ranges from 15 mol % to 35 mol %.

8. A molded article comprising the polyester according to claim 1.

* * * * *